No. 636,603. Patented Nov. 7, 1899.
H. M. WILLIAMS.
COFFIN.
(Application filed Mar. 30, 1899.)
(No Model.)

Witnesses
J. G. Hinkel
J. J. McCarthy

Inventor
Henry M. Williams
by Foster & Freeman
Attorneys

UNITED STATES PATENT OFFICE.

HENRY M. WILLIAMS, OF FORT WAYNE, INDIANA, ASSIGNOR OF ONE-FOURTH TO FRANZ BURGER, OF SAME PLACE.

COFFIN.

SPECIFICATION forming part of Letters Patent No. 636,603, dated November 7, 1899.

Application filed March 30, 1899. Serial No. 711,156. (No model.)

*To all whom it may concern:*

Be it known that I, HENRY M. WILLIAMS, a citizen of the United States, residing at Fort Wayne, in the county of Allen and State of Indiana, have invented certain new and useful Improvements in Coffins, of which the following is a specification.

My invention relates to coffins, and has for its object to provide an improved coffin adapted to receive and hold a body and provide for its desiccation; and to these ends my invention consists in a coffin comprising the various features of construction substantially as hereinafter more particularly pointed out.

Figure 1:
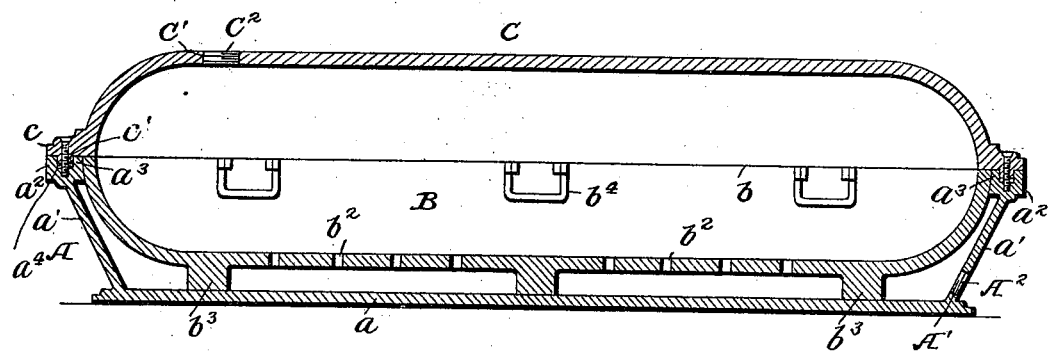
Figure 2:
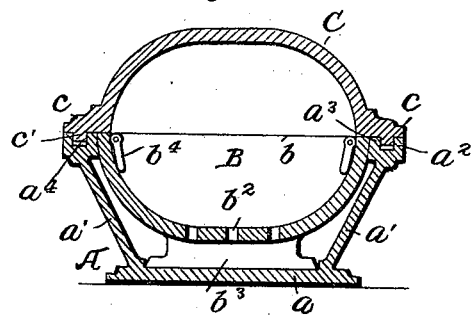
Figure 3:
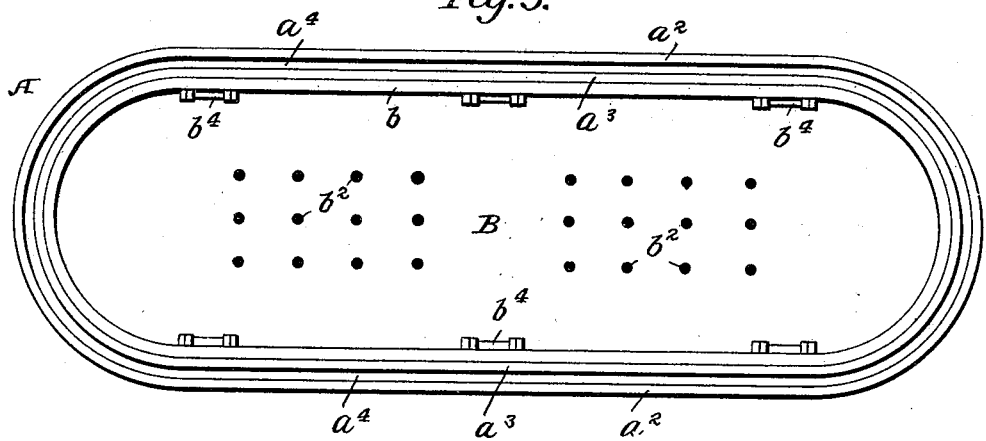

In the accompanying drawings, Figure 1 is a longitudinal vertical section of a coffin embodying my invention. Fig. 2 is a vertical transverse section of the same; and Fig. 3 is a plan of the same, showing the cover removed.

The coffin comprises practically three main parts or portions, and in the drawings A represents what I have termed an "outside" receptacle. This may be of any desired or suitable form and comprises a bottom portion $a$, from which projects a side portion $a'$, having at its upper edge an enlarged portion $a^2$, forming a suitable support for the cover and also, preferably, having an inwardly-extended projection $a^3$, adapted to receive and hold the inner receptacle B. This inner receptacle B, which is adapted to hold the body, is made of suitable shape to fit the outer receptacle, and its edges $b$ are preferably made so as to conform to the inwardly-extended projection $a^3$ on the outer receptacle when the parts are in position and so that its upper edge will be flush with the upper edge of the side $a'$ of the outer receptacle. This inner receptacle is provided with a series of openings $b^2$ at its bottom portion, and it is also preferably provided with suitable feet or bearing-pieces $b^3$, interposed between its bottom and the bottom of the outer receptacle and serving to support the inner receptacle in the outer receptacle or supporting it when the inner receptacle is removed for any purpose. I also provide some suitable means of readily removing the inner receptacle from the outer receptacle, and I have shown handles $b^4$, arranged on the inner side of the inner receptacle; but any other suitable devices may be provided for this purpose.

The cover C is made, of course, to conform to the general shape of the outer receptacle and has at its lower edge an extended flange $c$, so that it will fit the enlarged portion $a^2$ of the outer receptacle and also at the same time cover the edge of the inner receptacle. Suitable devices are provided for securing the cover to the outer receptacle, and I have shown the enlarged portion $a^2$ of the outer receptacle as provided with a groove $a^4$, into which fits a rib or flange $c'$ on the lower surface of the cover, and any suitable cement or packing material may be supplied to make an air-tight joint and the parts be held together by screws or other means.

It is often desirable to provide means for desiccating the body while in the coffin, and for this purpose the outside receptacle A is provided with an opening A', provided with a removable plug $A^2$, and the cover C is also provided with a similar opening C', closed by a suitable plug $C^2$. These openings are preferably arranged at opposite ends of the coffin, as shown, although they may be otherwise arranged.

The coffin may be made of any suitable material, but preferably of glass, indurated fiber, paper, or other material which can be molded into shape, although of course, if desired, it may be made of wood suitably coated or treated.

The inner receptacle B is intended to receive the body, and the object of the openings in the bottom thereof is to provide for the passage of any fluid escaping from the body, which will flow into the outer receptacle, allowing the body to rest upon the dry inner receptacle. Furthermore, if the body is to be treated before final interment this inner receptacle may be placed in a furnace or other convenient place without being removed from the receptacle and be subjected to air-blasts or otherwise, or, on the contrary, when the coffin is provided with the openings described hot air or gases may be introduced into the outer receptacle through the opening A', pass through the openings $b^2$ into the inner receptacle, and escape through the opening C' in the cover, which may afterward be closed by their plugs.

In the drawings I have shown a preferred shape and configuration of the receptacles and cover; but of course they may be of any desired shape, and it will be seen that the parts can be readily molded or otherwise formed and when fitted together and properly closed present an air-tight receptacle and at the same time provide a dry holder for the body.

What I claim is—

1. A coffin comprising an outer receptacle, an inner receptacle provided with openings and feet and fitting the outer receptacle, and a cover fitting both receptacles, substantially as described.

2. A coffin comprising an outer receptacle having an opening, an inner receptacle having openings and feet and fitting the outer receptacle, and a cover having an opening and fitting both of the receptacles, substantially as described.

3. A coffin comprising an outer receptacle having a base and side provided with an enlarged portion, an inner receptacle having openings and feet and a bearing on the enlarged portion of the outer receptacle, and a cover fitting both receptacles, substantially as described.

In testimony whereof I have signed my name to this specification in the presence of two subscribing witnesses.

HENRY M. WILLIAMS.

Witnesses:
   GEO. K. TORRENCE,
   PAUL W. STEVENS.